(12) United States Patent
Little et al.

(10) Patent No.: US 7,000,948 B2
(45) Date of Patent: Feb. 21, 2006

(54) INTERNALLY TETHERED SEAT BLADDER FOR OCCUPANT WEIGHT ESTIMATION

(75) Inventors: David R. Little, Kokomo, IN (US); Peter J. Schubert, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 47 days.

(21) Appl. No.: 10/718,331

(22) Filed: Nov. 20, 2003

(65) Prior Publication Data

US 2005/0110255 A1 May 26, 2005

(51) Int. Cl.
*B60R 21/16* (2006.01)

(52) U.S. Cl. .................... 280/743.1; 280/743.2

(58) Field of Classification Search ......... 280/743.1, 280/743.2; 297/452.41, DIG. 3, 216.1, 216.14, 297/216.16
See application file for complete search history.

(56) References Cited

U.S. PATENT DOCUMENTS

| 5,582,429 | A | 12/1996 | Heinz et al. ............ 280/743.2 |
| 5,902,010 | A | 5/1999 | Cuevas .................. 297/216.13 |
| 5,957,491 | A * | 9/1999 | Cech et al. ................ 280/735 |
| 5,987,349 | A | 11/1999 | Van Voorhies et al. |
| 5,987,370 | A | 11/1999 | Murphy et al. |
| 6,101,436 | A | 8/2000 | Fortune et al. |
| 6,113,141 | A | 9/2000 | Baker ..................... 280/743.2 |
| 6,220,629 | B1 | 4/2001 | Wipasuramonton et al. ..................... 280/743.1 |
| 6,296,276 | B1 | 10/2001 | Ritter .................... 280/743.2 |
| 6,490,936 | B1 | 12/2002 | Fortune et al. |

FOREIGN PATENT DOCUMENTS

WO 99/11483 3/1999

* cited by examiner

*Primary Examiner*—Faye M. Fleming
(74) *Attorney, Agent, or Firm*—Stefan V. Chmielewski

(57) ABSTRACT

An elastomeric seat bladder for a vehicle occupant weight estimation system includes a plurality of elastomeric tethers defined by bands or sheets of elastomeric material coupling upper and lower layers of the bladder within a peripheral weld in order to reduce fluid pooling and distention or bulging of the bladder due to localized loading. The elastomeric tethers are spot or seam welded to upper and lower sheets of the bladder; they extend to limit distension where required, and otherwise partially or fully collapse to minimize vertical shunting of occupant weight through the bladder.

5 Claims, 3 Drawing Sheets

150 7,000,948 B2

INTERNALLY TETHERED SEAT BLADDER FOR OCCUPANT WEIGHT ESTIMATION

TECHNICAL FIELD

The present invention is directed to a fluid-filled seat bladder for vehicle occupant weight estimation, and more particularly to a seat bladder having internal tethering.

BACKGROUND OF THE INVENTION

Occupant weight estimation systems are useful in connection with air bags and other pyrotechnically deployed restraints for purposes of discriminating the occupant category and judging whether, and how forcefully, to deploy the restraints. A well known weight estimation technique is to locate one or more fluid-filled bladders in or under a vehicle seat cushion, and to estimate the weight of the occupant based on a measure of the pressure in the bladder(s). See for example, the U.S. Pat. Nos. 5,987,370 and 6,246,936 to Murphy et al., and the U.S. Pat. Nos. 6,101,436 and 6,490,936 to Fortune et al., all of which are assigned to Delphi Technologies, Inc., as well as the U.S. Pat. No. 5,957,491 to Cech et al. and the U.S. Pat. No. 5,975,568 to Speckhart et al.

Typically, seat bladders are formed by peripherally joining two sheets of elastomeric material, by radio frequency welding, for example. Additional welds may also be formed at various locations within the periphery of the bladder in order to reduce fluid pooling and distention or bulging of the bladder due to localized loading, as well as to reduce the fluid volume, and therefore its weight. These inter-peripheral welds may be spot welds or seam welds, and can be used to form flow-through cells or fluid-free regions. See particularly the aforementioned U.S. Pat. Nos. 5,957,491; 5,975,568; 5,987,370; and 6,101,436.

A drawback of inter-peripheral welding in weight estimation seat bladders is that the bladder material in the vicinity of the weld provides a vertical support that effectively shunts a portion of the occupant weight through the bladder without significantly influencing the fluid pressure within the bladder. As a result, a given weight distributed over a relatively large area of the seat will produce a different pressure reading than the same weight when distributed over a relatively small area of the seat. Accordingly, what is needed is a bladder structure that will achieve the benefits of inter-peripheral welding without providing significant vertical support of occupant weight.

SUMMARY OF THE INVENTION

The present invention is directed to an improved occupant weight estimation apparatus for a vehicle seat in which an elastomeric seat bladder defined by peripherally welded upper and lower sheets of elastomeric material includes a plurality of elastomeric tethers defined by bands or sheets of elastomeric material coupling the upper and lower sheets within the peripheral weld in order to reduce fluid pooling and distention or bulging of the bladder due to localized loading. The elastomeric tethers are spot or seam welded to upper and lower sheets of the bladder; they extend to limit distension where required, and otherwise partially or fully collapse to minimize vertical shunting of occupant weight through the bladder.

BRIEF DESCRIPTION OF THE DRAWINGS

The present invention will now be described, by way of example, with reference to the accompanying drawings, in which:—

FIG. 2A shows the bladder in a fully distended condition, FIG. 2B shows the bladder in a condition of nominal distension, and FIG. 2C shows the bladder in a flattened condition.

FIG. 3A depicts a triangular pattern, FIG. 3B depicts a rectangular pattern, and FIG. 3A depicts a hexagonal pattern.

DESCRIPTION OF THE PREFERRED EMBODIMENT

Figure 1:
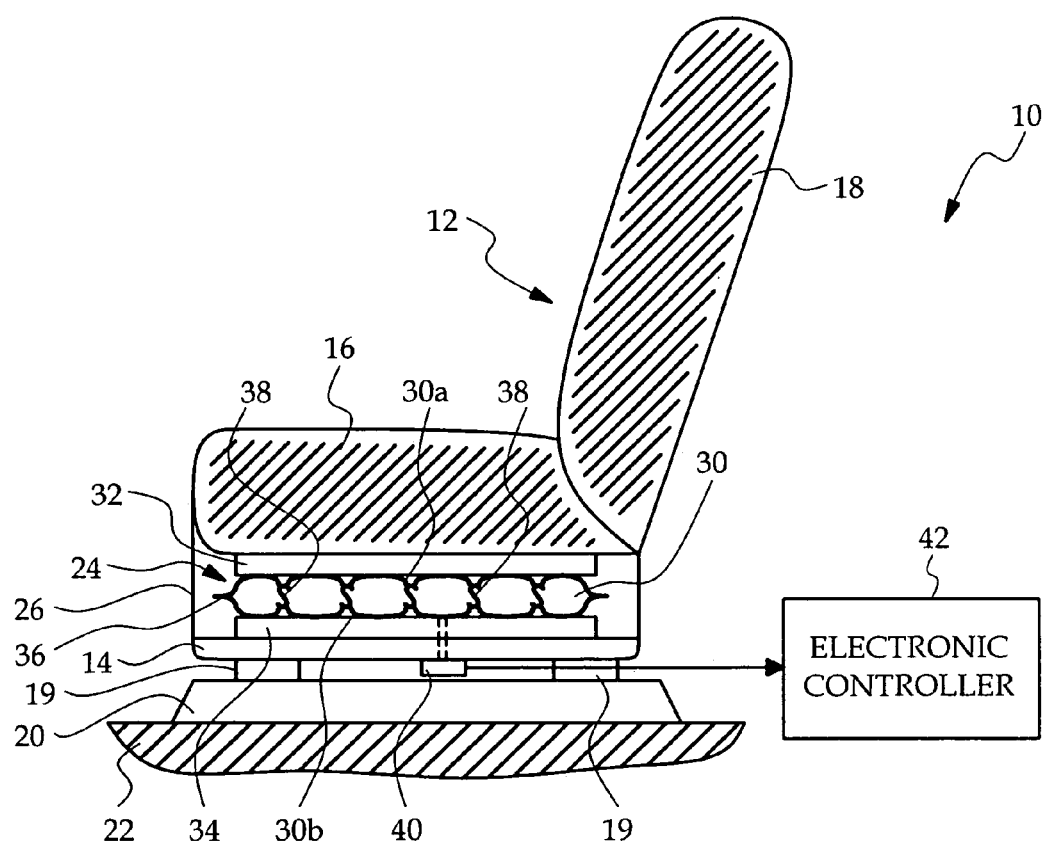
FIG. 1 is a diagram of a vehicle seat including an elastomeric bladder according to this invention for occupant weight estimation.

Referring to the drawings, and particularly to FIG. 1, the reference numeral 10 generally designates a vehicle occupant weight estimation apparatus according to this invention. The vehicle seat, generally designated by the reference numeral 12, includes a frame 14, a bottom foam cushion 16 and a back foam cushion 18. A set of posts 19 integral to the frame 14 attach the seat 12 to a pair of tracks 20 (only one of which is shown in FIG. 1), which in turn, are secured to the vehicle floor 22. A bladder assembly 24 is sandwiched between the bottom cushion 16 and the frame 14 for the purpose of detecting the presence and weight of an occupant of seat 12. Finally, a fabric cover 26 envelopes the cushion 16, bladder assembly 24 and frame 14.

The bladder assembly 24 includes an elastomeric bladder 30 defined by upper and lower sheets 30a, 30b of elastomeric material such as polyurethane or pellethane that are peripherally seam welded as indicated by the reference numeral 36 to form a closed volume that is filled with silicone or another suitable fluid, and a pressure sensor 40 for measuring the fluid pressure in bladder 30. In general, the weight of a vehicle occupant seated on the cushion 16 is applied to the bladder 30, and an electronic controller 42 coupled to the pressure sensor 40 develops an estimation of the occupant weight based on the measured pressure and its variation with respect to time; see, for example, the aforementioned U.S. Pat. Nos. 5,987,370 and 6,246,936. The assembly 24 typically also includes an upper interface panel 32 disposed between the upper bladder sheet 30a and the seat cushion 16, and a lower interface panel 34 disposed between the lower bladder sheet 30b and the seat frame 14. In general, the interface panels 32 and 34 protect bladder 30 from puncture damage, and limit the system sensitivity to variations caused by manufacturing irregularities.

In conventional practice, the upper and lower bladder sheets 30a, 30b are joined by spot or seam welding within the peripheral weld 36 to form a plurality of flow-through cells as disclosed in the aforementioned U.S. Pat. Nos. 5,957,491; 5,975,568; 5,987,370; and 6,101,436. The cells advantageously serve to reduce the fluid volume (and therefore weight) and to reduce fluid pooling and distention or bulging of the bladder due to localized loading. Additionally, the cells can be sized and positioned to tailor the bladder sensitivity to the occupant weight, as described for example in the aforementioned U.S. Pat. No. 6,101,436. As explained above, however, the bladder material in the vicinity of the inter-peripheral welds tends to shunt a portion of the occupant weight through the bladder without significantly influencing the fluid pressure within the bladder. As a result, a given weight distributed over a relatively large area of cushion 16 will produce a different pressure reading than the same weight when distributed over a relatively small area of cushion 16.

Figure 2A:
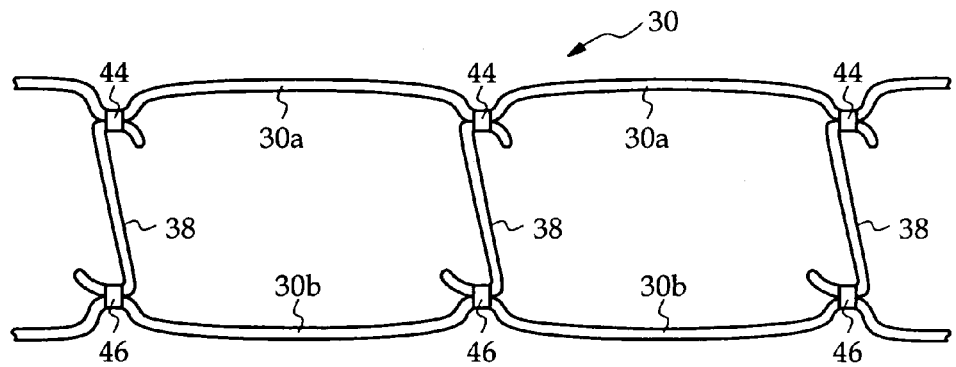
FIGS. 2A, 2B and 2C depict the elastomeric bladder of FIG. 1.
Figure 2B:
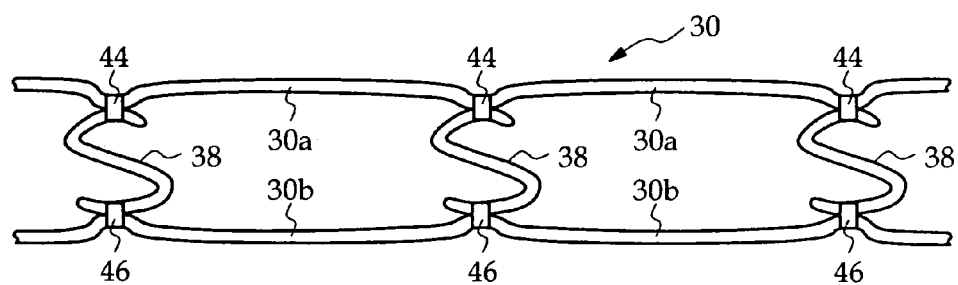
Figure 2C:
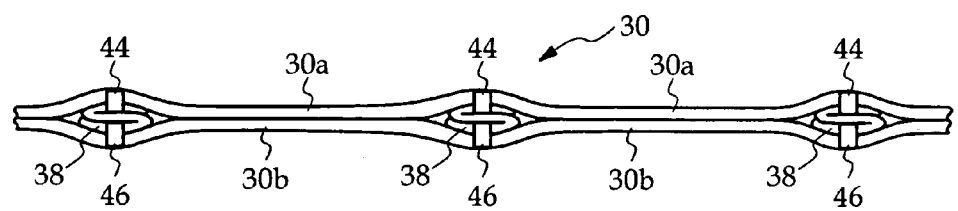

According to the present invention, the upper and lower layers 30a, 30b of the bladder 30 are internally coupled within the peripheral weld 36 by a number of elastomeric tethers 38 defined by bands or sheets of elastomeric material such as polyurethane or pellethane that are selectively welded to the upper and lower layers 30a, 30b. Referring to FIGS. 2A–2C, spot welds attaching the tethers 38 to the upper layer 30a are designated by the reference numeral 44, and spot welds attaching the tethers 38 to the lower layer 30b are designated by the reference numeral 46. The tethers 38 effectively create an array of flow-through cells within the bladder 30 as shown in FIGS. 1 and 2A–2C to achieve the advantages of conventional inter-peripheral spot welding of the layers 30a, 30b, but without establishing a vertical support structure through which occupant weight can be shunted through the bladder 30. Since occupant weight shunting is minimized, the bladder fluid pressure due to occupant seat weight is less sensitive to the area over which the weight is applied, leading to more accurate and consistent weight estimation. Of course, the length and spacing of the tethers 38 can be varied to control the degree of permitted separation of the layers 30a, 30b. As illustrated by FIG. 2A, the tethers 38 restrict separation of the layers 30a, 30b when occupant weight applied to one portion of bladder 30 tends to pool the bladder fluid in other portions of the bladder. As illustrated in FIG. 2B, the tethers 38 normally are in a state of partial collapse, and offer little or no vertical support structure through which occupant weight can be shunted through the bladder 30. Finally as illustrated in FIG. 2C, the tethers 38 fully collapse when the bladder 30 is flattened by an applied load; in this case, nearly all of the bladder fluid is displaced to other portions of the bladder 30 and the layers 30a, 30b are essentially pressed into engagement. In the region of the tethers 38, there will be a slight bulge in the bladder 30, but the bulges are very small and will not affect occupant comfort.

Figure 3A:
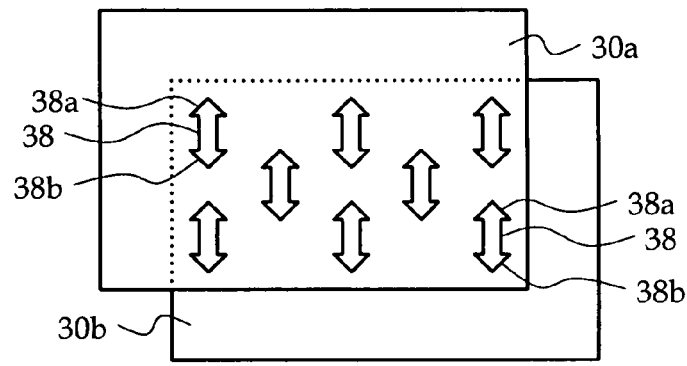
FIGS. 3A, 3B and 3C depict different tether configurations for the bladder of FIG. 1.
Figure 3B:
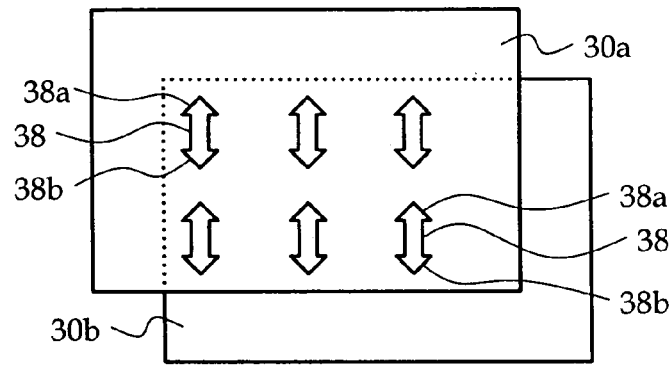
Figure 3C:
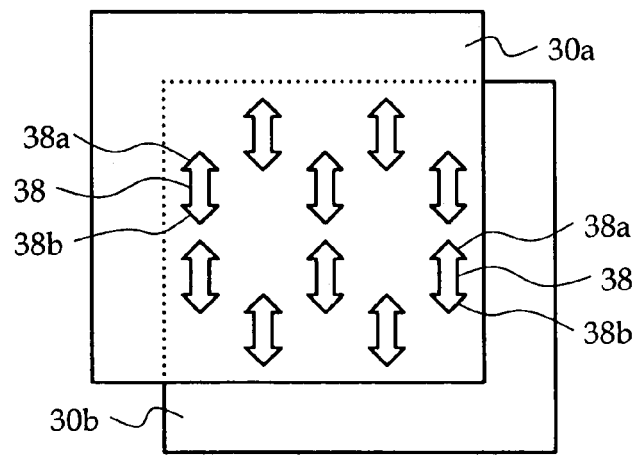

FIGS. 3A, 3B and 3C illustrate three different possible arrangements or repeat patterns of tethers 38. In each of the tethers 38, the upper triangular end 38a signifies a spot weld to the upper layer 30a of bladder 30, and the lower triangular end 38b signifies a spot weld to the lower layer 30b of bladder 30. FIG. 3A depicts a triangular or diamond-shaped repeat pattern, FIG. 3B depicts a rectangular repeat pattern, and FIG. 3A depicts a hexagonal repeat pattern. Obviously, other basic shapes may be used as well, and the pattern of tethers may be non-uniform if desired. As with spot welds, the repeat pattern of tethers 38 defines the cell shape; and in general, a spherical cell shape is preferred as the lowest energy configuration.

In summary, the present invention provides a seat bladder for occupant weight estimation that provides more accurate and consistent weight estimation without sacrificing the advantages achieved by inter-peripheral spot welding. While described in reference to the illustrated embodiments, it should be understood that various modifications will occur to persons skilled in the art. For example, the number and shape of the tethers 38 may be different than shown, the two or more individual tethers 38 may be joined into one or more sheets that are perforated for fluid flow, the tethers 38 may be joined to the upper and lower layers 30a, 30b of bladder 30 by sewing or adhesives, and so on. Thus, many variations are possible, and it will be understood that any of a number of configurations may fall within the scope of this invention, which is defined by the appended claims.

What is claimed is:

1. An elastomeric bladder disposed in a seat for occupant weight estimation, the bladder comprising:
   upper and lower sheets of elastomeric material peripherally welded to form a closed volume containing a bladder fluid; and
   a plurality of elastomeric tethers coupling said upper and lower sheets within said peripheral weld, where said tethers are in a state of partial collapse when no occupant weight is applied to said seat, and where tethers in any given portion of said bladder: (1) further collapse when occupant weight is applied to said seat and causes the bladder fluid to be displaced from said given portion of said bladder, and (2) extend to restrict separation of said upper and lower sheets when occupant weight is applied to said seat and causes the bladder fluid to collect in said given portion of said bladder.

2. The elastomeric bladder of claim 1, wherein at least one of said elastomeric tethers is in the form of a strip of elastomeric material, with a first end of said strip affixed to said upper sheet and a second end of said strip affixed to said lower sheet.

3. The elastomeric bladder of claim 1, wherein said tethers are arranged in a uniform geometric pattern.

4. The elastomeric bladder of claim 1, wherein said tethers are arranged in a non-uniform pattern.

5. The elastomeric bladder of claim 1, wherein two or more of said tethers are defined by a sheet of elastomeric tether material that is selectively spot welded to said upper and lower sheets.

* * * * *